INVENTOR.
GUY A. MORSE, JR.

BY Wade Koontz
ATTORNEY

April 20, 1965 G. A. MORSE, JR 3,179,350

REEL LOCK

Filed June 11, 1962 2 Sheets-Sheet 2

INVENTOR.
GUY A. MORSE, JR.
BY Wade Koontz
ATTORNEY

United States Patent Office
3,179,350
Patented Apr. 20, 1965

3,179,350
REEL LOCK

Guy A. Morse, Jr., Orlando, Fla., assignor to the United States of America as represented by the Secretary of the Air Force Filed June 11, 1962, Ser. No. 201,742
2 Claims. (Cl. 242—68.3)

The present invention relates to film or ribbon reels and, more particularly, to a reel locking device which both positions and locks a reel or spool to a shaft to be driven thereby.

Reel locking devices are known which perform the function of locating a reel at a single axial position on a shaft or spindle. Separate additional means, such as face plates affixed to the shaft and connected to protruding tabs on the reel, are used to drive the reel. The operation of these devices is limited to but a single reel, and at a single location on the shaft. In addition, due to the separate locking and driving means, these devices tend to be relatively complex, part of the mechanism being permanently attached to the reel and part to the shaft.

Accordingly, it is a primary object of this invention to provide a reel locking device which both accurately locates the reel at an axial position on the shaft and locks the reel to the shaft to insure rotation of the reel and the shaft as a unit.

Another object of this invention is to provide means for locking one or more reels at a plurality of axial positions along a shaft.

A further object of this invention is to provide a reel locking and driving device of very simple design.

Still another object of this invention is to provide a reel locking device having both its axial positioning means and rotational locking means permanently attached in a simple manner to the reel.

A further object of this invention is to provide a reel locking device which is capable of positive action under adverse environmental conditions and thus capable of use with mobile equipment.

These objectives are accomplished in accordance with the present invention by a reel locking device having a slide mounted upon the side of the reel. The slide has an aperture which can be aligned with the aperture of the reel so that the shaft can pass through both the reel and the slide when these apertures are aligned. Along the shaft, grooves are provided to receive the slide to axially position the reel. A portion of the slide and a portion of the groove are adapted for mutual engagement to rotationally lock the reel to the shaft.

A more detailed understanding of this invention will be obtained from the following specification with reference to the accompanying drawings.

Figure 1:
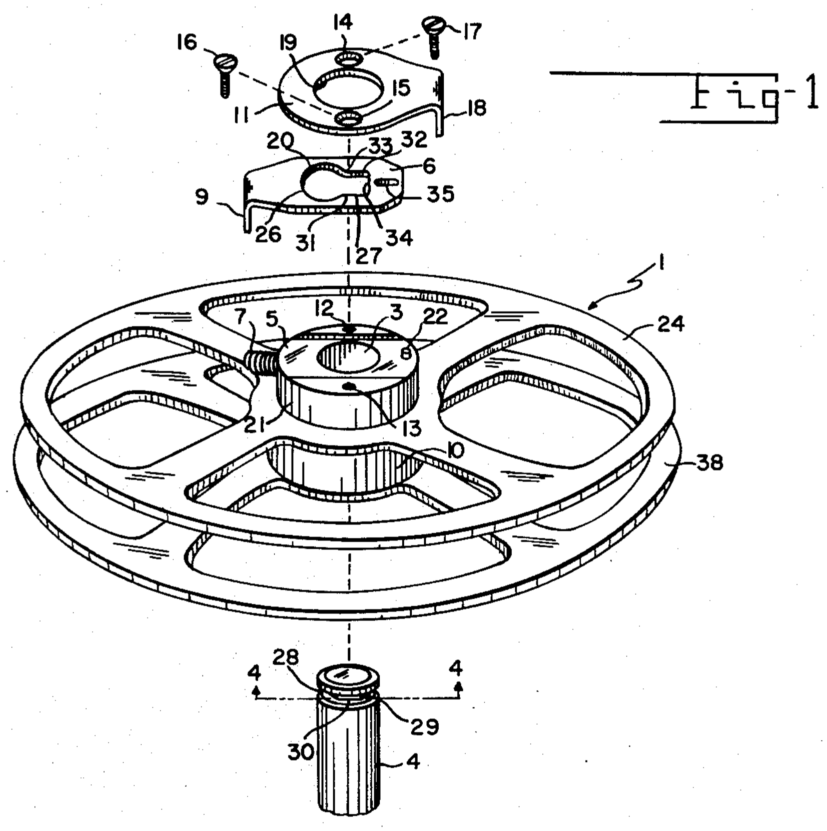
FIG. 1 is a partially exploded perspective view of the reel and locking device and shows a shaft having a groove thereon.
Figure 2:
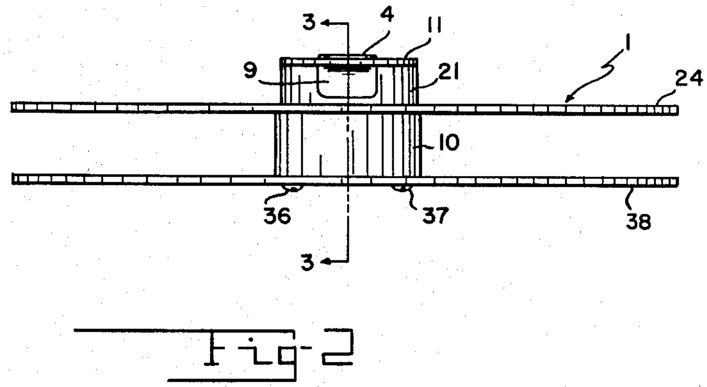
FIG. 2 is a side elevation view of the reel and locking device.
Figure 3:
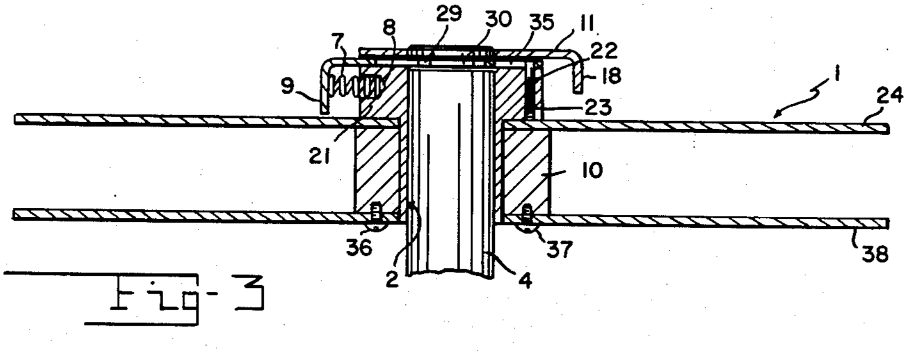
FIG. 3 is a sectional view of the device taken along section lines 3—3 of FIG. 2.

Referring to the drawings there is shown a reel 1 for holding film, magnetic recording tape, typing ribbon or the like, which has a raised flanged sleeve 2 seated in the reel hub 10. The sleeve 2 has a central aperture 3 which runs completely through the sleeve and, in this embodiment, is circular to fit easily over the circular cylindrical surface of shaft 4. Shaft 4 is shown aligned with aperture 3 in position to receive the reel. The shaft may have any number of grooves for locating reels at different positions along the shaft length. For simplicity, only a single groove is shown. Driving means, not shown, may be used to rotate the shaft.

The raised flange portion 21 of sleeve 2 has a rectangular cross-sectioned groove 5 extending across its face. Slide 6 is fitted to slide in groove 5 and advantageously has a thickness equal to the depth of groove 5. This thickness is also chosen so that slide 6 fits easily but snugly in groove 28 on shaft 4. Slide 6 forms a finger tab 9 at one end which overhangs raised flange 21. A compression spring 7 is seated in a blind hole 8 in the side of the raised flange. The spring 7 abuts finger tab 9 to bias the slide 6 in the direction of groove engagement.

Slide 6 has apertures 20 and 35 therein. Aperture 35 has a pin 22 extending therethrough which provides positive limits in the travel of slide 6. At the limit of travel, the apertures in the slide and the sleeve are aligned in a manner permitting the shaft to pass therethrough. Pin 22 is seated in a hole 23 in the sleeve flange.

Slide 6 is retained within groove 5 by a cap 11 which is mounted upon the raised flange 21. The mounting means in this embodiment are screws 16 and 17 which extend through threadless holes 14 and 15 in the cap 11 and threadless holes 12 and 13 in the raised flange 21. Advantageously, the screws 16 and 17 further extend through threadless holes (not shown) in the reel face plate 24 and into threaded holes (not shown) in the reel hub, so that these screws fasten together the cap, the sleeve, the reel face plate and the hub. The opposite reel face plate 38 is fastened to the hub 10 by screws 36 and 37.

The cap 11 has an extended portion forming a finger tab 18 which overhangs the slide 6 and the raised flange 21. Finger tab 18 aids the user in applying finger pressure to finger tab 9 to actuate the slide 6 for adding or removing the reel to or from the shaft.

Figure 4:
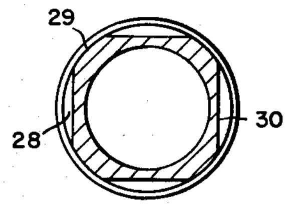
FIG. 4 is an enlarged sectional view of the shaft taken along section line 4—4 of FIG. 1.

Aperture 20 in slide 6 can best be described with reference to FIGS. 1 and 4.

The portion 26 of aperture 20 nearest to the finger tab 9 is shaped to permit passage therethrough of shaft 4. In the present embodiment, shaft 4 is shown as a circular cylinder and, thus, aperture portion 26 is semicircular with extended tangential sides.

The portion 27 of aperture 20 opposite to aperture portion 26 is shaped to engage a portion of the groove 28 in such a manner as to lock the slide 6 into fixed rotational position with respect to the shaft. For example, aperture portion 27 may be tongue-shaped to fit into a hole in the groove. In the present embodiment, the bottom surfaces of the groove 28 form a square cross section in shaft 4, with beveled vertices, as shown in FIG. 4. Aperture portion 27 is slot-shaped to engage this square section of shaft 4, with sides 31 and 32 spaced apart to fit across the flats 30 of the square section. Side 34 is biased against another flat by the action of compression spring 7 (FIG. 1) to retain the slide in locked engagement within the groove 28.

In operation, the locking device acts to lock the reel to the shaft as follows. Finger tab 9 is pressed with the aid of stationary finger tab 18, moving slide 6 to its limit of travel. Slide aperture portion 26 is then in aligned position over sleeve aperture 3 enabling shaft 4 to pass through the reel and the slide. The finger tabs are then released, with the reel at any position along the shaft. The spring 7 urges the slide against the shaft, the slide contacting the shaft at slide aperture places 33. The reel is then moved along the shaft until the slide drops into the intended groove. Rotation of the reel then allows the aperture portion 27 to engage the groove flats 30. The beveled vertices 29 facilitate this rotation and protect the aperture portion 27 from being deformed as it is rotated into alignment with the groove flats. In the above-described manner, the reel is positioned and locked axially and rotationally with spring 7 providing a continuous positive locking action.

It is to be understood that this invention is not limited to the specific embodiment shown and described, but that various alterations and modifications may be made without departing from the spirit and scope of this invention as claimed.

I claim:

1. In combination a rotatable shaft and a reel locking device comprising:

(*a*) a rotatable shaft having at least one continuous peripheral groove therein, the bottom of said groove being defined in part by parallel flat surfaces;

(*b*) a circular apertured reel for removable and rotatable mounting on said shaft;

(*c*) slide means slidably mounted on said reel for longitudinal movement normal to the axis of said shaft, said slide means having a circular aperture and a rectangular aperture longitudinally communicating with the circular aperture, the circular aperture being longitudinally alignable with the reel aperture to permit passage of said shaft therethrough, the rectangular aperture being configured to engage said parallel flat surfaces in said groove in said shaft to axially and rotatably join said reel to said shaft;

(*d*) spring biasing means cooperatively acting between said reel and said slide means for releasably biasing said slide means into the engaged position with said shaft.

2. In combination a rotatable shaft and a reel locking device comprising:

(*a*) a rotatable shaft having at least one continous peripheral groove therein, the bottom of said groove being defined in part by parallel flat surfaces;

(*b*) a circular apertured reel having a central circular apertured hub for removable and rotatable mounting on said shaft;

(*c*) cap retaining means having a circular aperture of substantially the same size as the circular aperture in the hub of said reel, said cap retaining means being joined to one face of the hub on said reel with the circular aperture in said cap retaining means coaxial with the circular aperture in the hub of said reel;

(*d*) slide means slidably disposed and retained between said cap retaining means and the adjacent hub on said reel for longitudinal movement normal to the axis of said shaft, said slide means having a circular aperture and a rectangular aperture longitudinally communicating with the circular aperture, the circular aperture being longitudinally alignable with the reel aperture to permit passage of said shaft therethrough, the rectangular aperture being configured to engage said parallel flat surfaces in said groove in said shaft to axially and rotatably join said reel to said shaft;

(*e*) spring biasing means cooperatively acting between said reel and said slide means for releasably biasing said slide means into the engaged position with said shaft.

References Cited by the Examiner

UNITED STATES PATENTS

| | | | |
|---|---|---|---|
| 1,775,610 | 9/30 | Weiss | 242—68.3 |
| 1,827,488 | 10/31 | Roach | 242—68.3 X |
| 2,147,776 | 2/39 | Mitchell | 242—71.9 X |
| 2,437,309 | 3/48 | Veatch | 242—68.3 X |
| 2,483,528 | 10/49 | Christoff | 242—68.3 |
| 2,640,658 | 6/53 | Swanson | 242—68.3 |
| 2,911,875 | 11/59 | Ostermann et al. | 242—147 X |
| 2,916,226 | 12/59 | McGraw | 242—68.3 |
| 3,025,016 | 3/62 | De Boo | 242—71.9 |

MERVIN STEIN, *Primary Examiner.*

HARRISON R. MOSELEY, *Examiner.*